(12) United States Patent
Juutinen (10) Patent No.: US 11,339,004 B2
(45) Date of Patent: May 24, 2022

(54) MOVABLE MATERIAL PROCESSING APPARATUS COMPRISING A FOLDABLE CONVEYOR

(71) Applicant: Metso Minerals, Inc., Tampere (FI)

(72) Inventor: Tuomas Juutinen, Tampere (FI)

(73) Assignee: Metso Minerals, Inc., Tampere (FI)

( * ) Notice: Subject to any disclaimer, the term of this patent is extended or adjusted under 35 U.S.C. 154(b) by 0 days.

(21) Appl. No.: 16/982,666

(22) PCT Filed: Mar. 23, 2018

(86) PCT No.: PCT/EP2018/057529
§ 371 (c)(1),
(2) Date: Sep. 21, 2020

(87) PCT Pub. No.: WO2019/076488
PCT Pub. Date: Apr. 25, 2019

(65) Prior Publication Data
US 2021/0016975 A1    Jan. 21, 2021

(51) Int. Cl.
*B65G 41/00*    (2006.01)
*B02C 21/02*    (2006.01)

(52) U.S. Cl.
CPC ......... *B65G 41/002* (2013.01); *B65G 41/007* (2013.01); *B65G 41/008* (2013.01);
(Continued)

(58) Field of Classification Search
CPC .... B65G 21/10; B65G 41/002; B65G 41/005; B65G 41/007; B65G 41/008;
(Continued)

(56) References Cited

U.S. PATENT DOCUMENTS 7,223,059 B2 *  5/2007  Smith ................. B65G 41/002
                                                  198/313
8,505,738 B2 *  8/2013  O'Keeffe ................. B07B 1/46
                                                  209/421
(Continued)

FOREIGN PATENT DOCUMENTS

CN   203439607 U   2/2014
CN   107635893 A   1/2018
(Continued)

OTHER PUBLICATIONS

International Search Report and Written Opinion for International Application No. PCT/EP2018/057529 dated Dec. 20, 2018.
(Continued)

*Primary Examiner* — Gene O Crawford
*Assistant Examiner* — Keith R Campbell
(74) *Attorney, Agent, or Firm* — Andrus Intellectual Property Law, LLP (57) ABSTRACT

A movable material processing apparatus for handling material such as ore, gravel, rock or the like, that includes: a foldable conveyor for discharging material from the apparatus. The foldable conveyor is movable between a transport position and an operating position. The foldable conveyor includes a loading block arranged at the loading end, and a discharge block extending from the loading block towards a discharge end. The discharge block is pivotally coupled to the loading block along a first axis being perpendicular to a transport path of the foldable conveyor and parallel with a carrying surface of the foldable conveyor. The loading block is pivotally coupled to a support structure of the movable material processing apparatus along a second axis being parallel to the transport path.

12 Claims, 7 Drawing Sheets

(52) U.S. Cl.
CPC ...... *B02C 21/026* (2013.01); *B65G 2201/042* (2013.01); *B65G 2812/02029* (2013.01)

(58) Field of Classification Search
CPC ........ B65G 2201/042; B65G 2201/045; B65G 2812/02029; B02C 21/026; B07B 1/005
See application file for complete search history.

(56) References Cited

U.S. PATENT DOCUMENTS

| | | | | |
|---|---|---|---|---|
| 8,573,387 | B2* | 11/2013 | Trimble | B65G 41/002 198/632 |
| 9,150,361 | B2 | 10/2015 | Murphy | |
| 9,808,834 | B2* | 11/2017 | Andersen | B07B 13/16 |
| 10,087,009 | B2 | 10/2018 | Weller et al. | |
| 10,118,197 | B2* | 11/2018 | Boese | B07B 13/16 |
| 2009/0173671 | A1 | 7/2009 | O'Keefe et al. | |
| 2014/0367222 | A1* | 12/2014 | Byrne | B65G 15/26 198/588 |

FOREIGN PATENT DOCUMENTS

| | | |
|---|---|---|
| EP | 2137090 B1 | 9/2008 |
| GB | 2459898 A | 11/2009 |

OTHER PUBLICATIONS

International Preliminary Report on Patentability for International Application No. PCT/EP2018/057529 dated Jul. 20, 2020.
Chinese Search Report for corresponding Chinese Application No. 2018800913552 dated Jul. 29, 2021.
First Examination Report for corresponding Indian Patent Application No. 202017042111 dated Mar. 17, 2022.

\* cited by examiner

MOVABLE MATERIAL PROCESSING APPARATUS COMPRISING A FOLDABLE CONVEYOR

CROSS-REFERENCE TO RELATED APPLICATIONS

This application is the U.S. national stage application of International Application PCT/EP2018/057529, filed Mar. 23, 2018, which international application was published on Apr. 25, 2019, as International Publication WO 2019/076488 A1 in the English language.

FIELD OF THE INVENTION

The present invention relates to movable material processing apparatus for handling material such as ore, gravel, rock or the like. More specifically, the disclosure relates to a movable material processing apparatus comprising a foldable conveyor.

BACKGROUND ART

Movable material processing apparatus are known in the art. They are used to perform specific tasks at mining sites, quarries etc. and are characterized in that they are possible to move around to different locations dependent on the needs. Different tasks may be performed dependent on the specific embodiment of such an apparatus. Many movable material processing apparatuses are mobile screen units used to sort materials of different fractions. The movable material processing apparatus may alternatively, or additionally, comprise a crusher, such as a jaw crusher, a cone crusher or an impact crusher. An excavator or wheeled loader, for example, loads the material to be processed into a feed hopper of the movable material processing apparatus from where the material to be processed is transported by means of feeders, and/or conveyor systems to processing means such as crusher and screen units. After processing, the material is discharged from the movable material processing apparatus. The discharging may be achieved by means of special conveyors. It is often convenient to allow discharging at a side of the apparatus, a task typically requiring side conveyors. Such conveyors are often removable and thus transported separately. Removable conveyors are, however, a disadvantage as they require mantling and dismantling, which may be time-consuming and complicated. Also, at least one additional transport vehicle is typically required for moving the conveyors between different locations.

To meet this problem, foldable conveyors is sometimes used, the foldable conveyors being foldable between at least one operating position at which the foldable conveyor is used to discharge material from the movable material processing apparatus, and at least one transport position at which the foldable conveyor is folded and disposed with respect to the apparatus such as to reduce, or minimize, the overall dimensions of the apparatus during transport between different locations. Often, these foldable conveyors are folded upwardly which requires a lot of height even if a telescope conveyor is used to reduce the overall height. In some cases, space for transport position is limited and a lower side conveyor transport position is needed. Moreover, as upwardly-folding conveyors require space above the conveyor, the upward-folding approach severely limits the options available when designing a movable material processing apparatus. For example, screens, conveyers, feeders and other units on the apparatus cannot extend too far out towards the side at which the foldable conveyor extends, as these units would be in the way when attempting to fold the conveyor upwardly. In an attempt to meet this problem, European Patent EP 2 137 090 B1 suggests using a foldable conveyor, which during transport, is arranged to be disposed substantially parallel with a longitudinal direction of the apparatus along a side thereof. A problem with the foldable conveyor of EP 2 137 090 B1 is the complicated mechanical link used to move the conveyor from the operating position to the transport position. There is thus a need in the art for a simplified and more durable foldable conveyor overcoming these problems.

SUMMARY

It is an object to mitigate, alleviate or eliminate one or more of the above-identified deficiencies in the art and disadvantages singly or in any combination and solve at least the above mentioned problem. According to a first aspect there is provided a movable material processing apparatus for handling material such as ore, gravel, rock or the like, comprising:

a foldable conveyor for discharging material from the apparatus, wherein said foldable conveyor is movable between a transport position and an operating position, wherein the foldable conveyor, when arranged in the operating position, defines a carrying surface for transporting material along a transport path from a loading end of the conveyor at which material is loaded onto said carrying surface, to a discharge end of the conveyor at which material is discharged from the conveyor, said foldable conveyor comprising a loading block arranged at the loading end, and a discharge block extending from said loading block towards the discharge end, wherein said discharge block is pivotally coupled to said loading block along a first axis being perpendicular to said transport path and parallel with the carrying surface of the foldable conveyor, and wherein said loading block is pivotally coupled to a support structure of said movable material processing apparatus at the loading end along a second axis being parallel to said transport path at the loading end.

The foldable conveyor may be advantageous as it allows for moving the foldable conveyor from an operating position to a transport position utilizing a much less complicated mechanical suspension than previously known in the art. Moreover, the mechanical suspension of the present disclosure allows for a higher degree of freedom as it may be realized using two separately operated systems for pivoting along the first and second axis respectively. This allows for different folding procedures dependent on the circumstances. For example, the discharge frame may be pivoted upwardly from the operating position along the first axis before the loading frame is pivoted along the second axis to arrange the conveyer in the transport position. Alternatively, the loading frame may first be pivoted while the conveyor is in the operating position, hence effectively tilting the whole conveyer without substantially altering the transport path of the conveyor, whereby the discharge frame is pivoted in relation to the loading frame along the first axis such as to arrange the conveyer in the transport position. It is also conceivable to perform the folding process in more than two steps. For example, geometrical constraints may require a plurality of pivoting operations along the first and second axis, respectively. This may be required when further objects are disposed close to the machine preventing a simple two-step process as disclose hereinabove. As readily realized by the skilled person, the pivoting along the first axis may occur simultaneously with a pivoting along the second axis.

The loading block and/or the discharge block may comprise frame structures. The loading block may preferable comprise one rigid frame structure. The discharge block may, preferable comprise one rigid frame structure. Alternatively, the discharge block may comprise two or more frame structures. For example, it is conceivable that the discharge block comprises two frame structures arranged to be slidably connected to each other so as to constitute a telescopic extension of the foldable conveyor. The loading block and/or the discharge block may be made from a metal, preferably steel.

According to some embodiments, the discharge block extends out from a side of the apparatus when the foldable conveyor is in the operating position, and the discharge block is disposed along the side of the apparatus when the foldable conveyor is in the transport position.

According to some embodiments, the foldable conveyor comprises one or more conveyor belts carried by the loading and discharge blocks, said one or more conveyor belts being arranged to provide said carrying surface.

According to some embodiments, the foldable conveyor comprises one common conveyor belt arranged to form a transition between the loading and discharge blocks to provide said carrying surface. This may be an advantage as is allows for less problem with material unwantedly leaving the foldable conveyor at gaps formed between conveyor belts.

According to some embodiments, the second axis is substantially parallel with a lateral direction of the movable material processing apparatus. Alternatively, the second axis is parallel with a lateral direction of the movable material processing apparatus. Alternatively, the second axis forms an angle defined along the longitudinal direction being within the interval +/−10 degrees with respect to the lateral direction of the movable material processing apparatus.

According to some embodiments, the second axis is located on a side of the loading block opposite to the side where material is loaded onto the foldable conveyor. In other words, the second axis may be located under the conveyer belt. This may be an advantage as it considerably simplifies the mechanical suspension of the loading block, as the second axis is not intersecting the region where conveyer belts are disposed.

According to some embodiments, the discharge block is pivotable in relation to said loading block along the first axis using one or more first hydraulic actuators.

According to some embodiments, the loading block is pivotable in relation to the support structure of the movable material processing apparatus along the second axis using one or more second hydraulic actuators.

The first and second hydraulic actuators may be operatively coupled to a common hydraulic system capable of selectively operating the first hydraulic actuators and the second hydraulic actuators, respectively. Alternatively, the first hydraulic actuators may be operatively coupled to a first hydraulic system and the second hydraulic actuators may be operatively coupled to a second hydraulic system.

According to some embodiments, the discharge block of the foldable conveyor, when the conveyor is in the transport position, is disposed against a side of the apparatus such that a normal of the carrying surface at the discharge end is substantially parallel with the lateral direction of the apparatus. Alternatively, according to some embodiments, the discharge block of the foldable conveyor, when the conveyor is in the transport position, is disposed against a side of the apparatus such that a normal of the carrying surface at the discharge end is parallel with the lateral direction of the apparatus. It is conceivable that the discharge block of the foldable conveyor, when the conveyor is in the transport position, is disposed against a side of the apparatus such that the normal of the carrying surface at the discharge end forms an angle within the interval 0-10 degrees with the lateral direction of the apparatus.

According to some embodiments, the discharge block is generally directed towards a rear end of the apparatus, and forms an angle α in the interval $0<\alpha<60°$ with respect to a longitudinal direction of the apparatus.

According to some embodiments, the movable material processing apparatus is one from: a movable screen, a movable crusher and a movable conveyor. However, it is conceivable that the movable material processing apparatus is any kind of movable apparatus having capability for processing material such as ore, gravel, rock or the like. In other words, the movable material processing apparatus may comprise one or more from: a screen, a crusher and a conveyor.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

Terminology

The term "longitudinal direction" should be construed as a general forward direction of the movable material processing apparatus, i.e. the length of the apparatus. Thus, the longitudinal direction extends from a rear end of the apparatus to a front end of the apparatus and is aligned in the plane at which the apparatus is disposed, which typically is a horizontal or near-horizontal plane.

The term "lateral direction" should be construed as the direction perpendicular to the longitudinal direction in the plane at which the apparatus is disposed, i.e. defining a width of the apparatus. Thus, the lateral direction extends from a first side of the apparatus to a second, opposite, side of the apparatus.

BRIEF DESCRIPTIONS OF THE DRAWINGS

The invention will by way of example be described in more detail with reference to the appended drawings, which shows presently preferred embodiments of the invention.

FIG. 1 shows a perspective view of a movable material processing apparatus according to embodiments of the present disclosure. In FIG. 1, the foldable conveyor is in an operating position. Parts of the apparatus, such as e.g. screens, crushers and feeders arranged at upper parts of the apparatus have been omitted for clarity.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
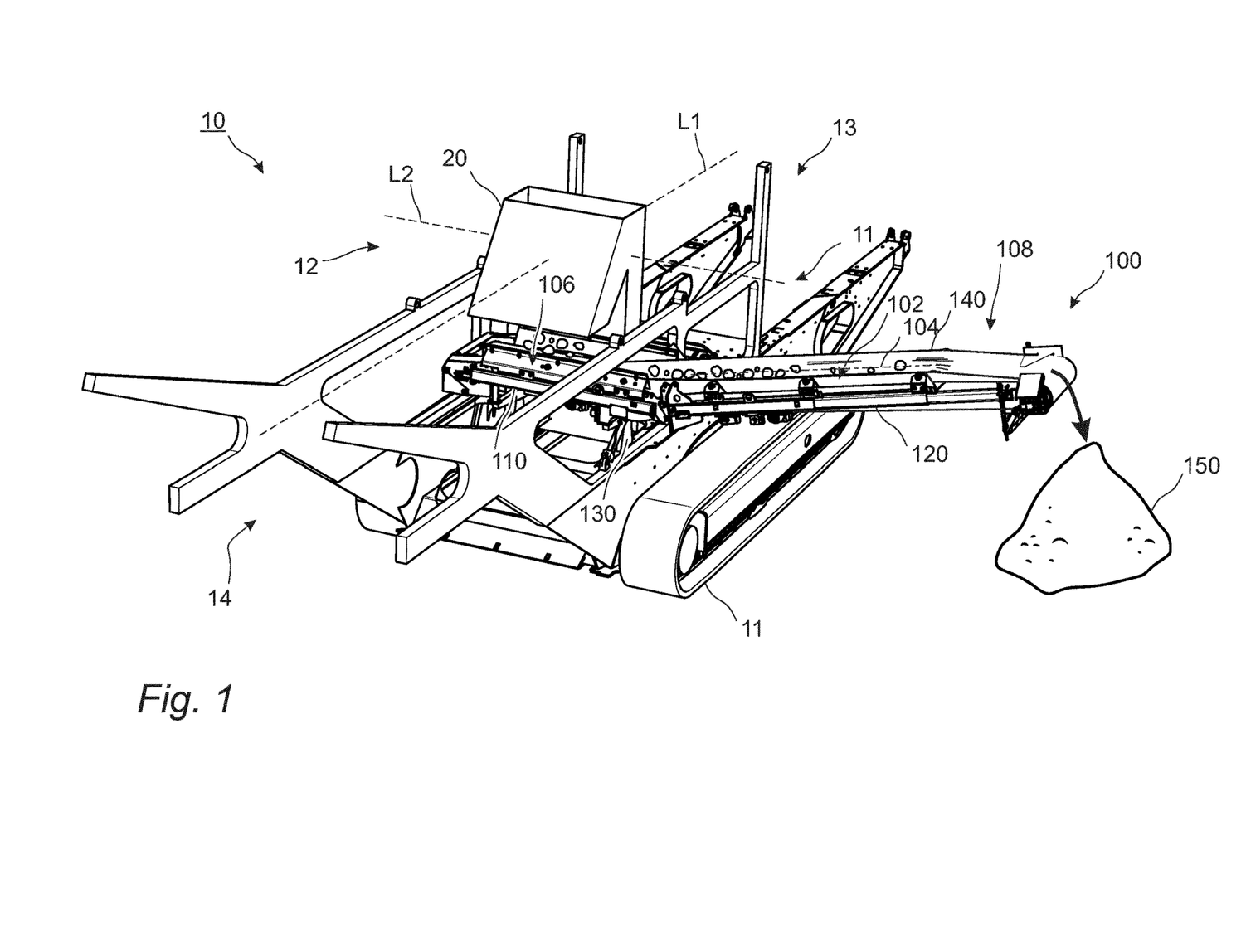

FIG. 1 shows a movable material processing apparatus 10 for handling material such as ore, gravel, rock or the like. The movable material processing apparatus 10 extends along a longitudinal direction L1 from a rear end 13 to a front end 14, and along a lateral direction L2 between opposing sides 11,12 of the apparatus. The movable material processing apparatus 10 may be moved by means of a continuous track arrangement 11. The movable material processing apparatus 10 comprises processing means for processing the material and internal transport means for transporting the material through the apparatus 10. The processing and internal transport means of the movable material processing apparatus 10 is not explicitly discussed herein. It should be understood that many alternative embodiments of a movable material processing apparatus 10 comprising many alternative configurations of processing and internal transport means exist within the scope of the claims. For example, the movable material processing apparatus 10 may be a mobile screen used to sort different dimensions of material. The movable material processing apparatus 10 may alternatively, or additionally, comprise a crusher, such as a jaw crusher. An excavator or wheeled loader, for example, loads the material to be processed into a feed hopper of the movable material processing apparatus 10 from where the material to be processed is transported by means of e.g. feeders, and/or conveyor systems to processing means such as e.g. a crusher and/or a screen arrangement.

After processing, the material is discharged from the movable material processing apparatus. For the purpose of discharging, the movable material processing apparatus 10 comprises a foldable conveyor 100 for discharging material from the apparatus 10. The foldable conveyor 100 is movable between a transport position T and an operating position O. This folding allows for the movable material processing apparatus 10 to be reduced in size so as to be easily transported between different locations. The different positions will be further described later.

The foldable conveyor 100, when arranged in the operating position O, defines a carrying surface 102 for transporting material along a transport path 104 from a loading end 106 of the conveyor at which material is loaded onto the carrying surface 102, to a discharge end 108 of the conveyor 100 at which material is discharged from the conveyor 100. The material is loaded onto the foldable conveyor by means of a chute 20 arranged above the foldable conveyor 100 at the loading end 106.

The foldable conveyor 100 comprises a loading block 110 arranged at the loading end 106, and a discharge block 120 extending from said loading block 110 towards the discharge end 108. The loading block 110 and the discharge block 120 are steel frames arranged to provide support for the carrying surface 102.

The foldable conveyor 100 comprises one common conveyor belt 140 arranged to form a transition between the loading 110 and discharge 120 blocks to provide said carrying surface 102.

As can be seen in FIG. 1, the discharge block 120 extends out from a side 11 of the apparatus 10 when the foldable conveyor 100 is in the operating position O. This allows for discharging material at a position located some distance from the apparatus 100, as visualized in FIG. 1 by the pile 150.

Turning now to FIG. 2-6, the folding and unfolding of the foldable conveyor 100 will be described in more detail. FIG. 2a is a simplified representation of the foldable conveyor 100 and FIG. 2b-e defining the different positions thereof. FIG. 3-6 are more realistic representations of the same positions shown in FIGS. 2b-e.

Figures 2A, 2B, 2D:
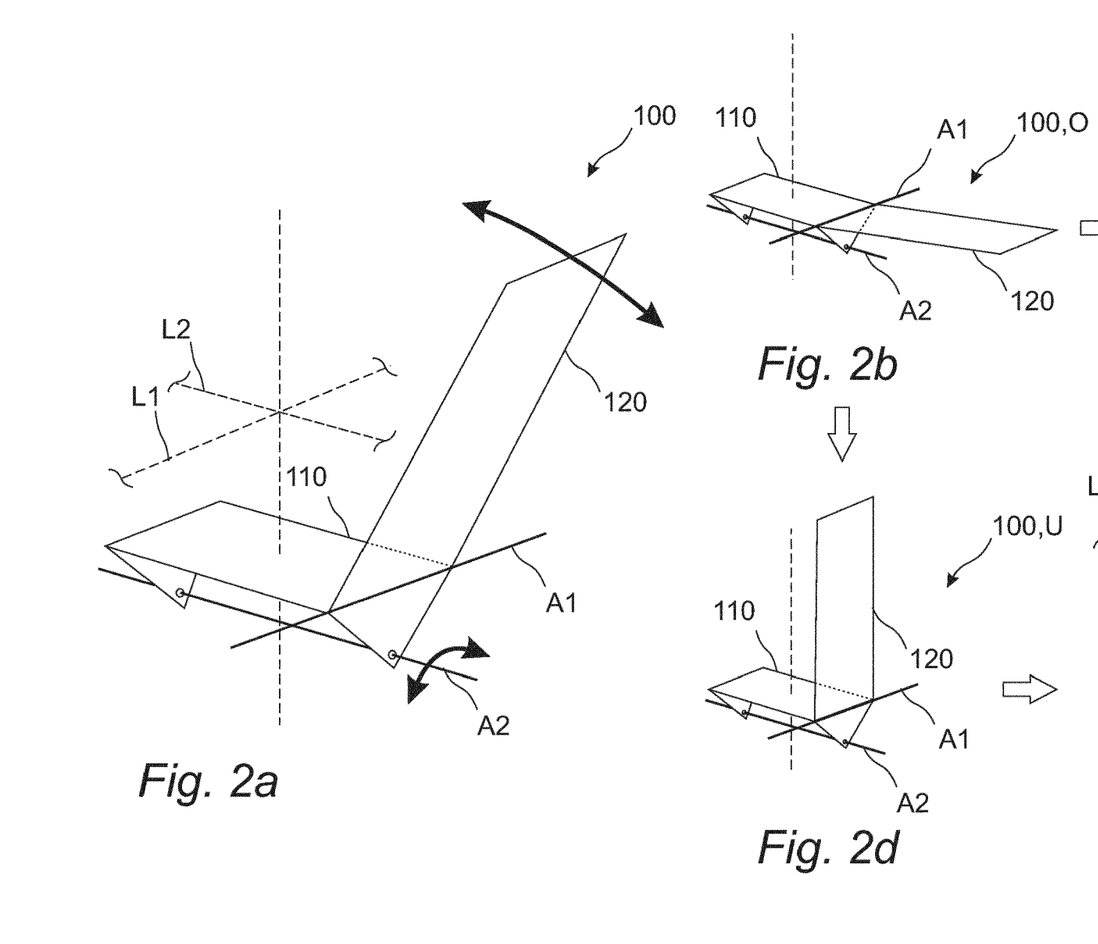
FIG. 2a is a simplified perspective view of the foldable conveyor.
FIG. 2b is a simplified perspective view of the foldable conveyor when arranged in an operating position.
FIG. 2d is a simplified perspective view of the foldable conveyor when arranged in a rotated position.

As most clearly seen in FIG. 2a, but also visualized in FIGS. 3-6, the discharge block 120 is pivotally coupled to the loading block 110 along a first axis A1 being perpendicular to said transport path 104 and parallel with the carrying surface of the foldable conveyor 100. Furthermore, the loading block 110 is pivotally coupled to a support structure 130 (see FIG. 3) of the movable material processing apparatus 10 at the loading end 106 along a second axis A2 being parallel to said transport path 104 at the loading end 106. Hence the conveyor 100 may be pivoted in two ways. The discharge frame 120 may be pivoted in relation to the loading frame 110 and the loading frame 110 may be pivoted in relation to the apparatus 10. From this, it is understood that, for the example embodiment, the first axis A1 will shift its orientation when pivoting the foldable conveyor 100 along the second axis A2, whereas the second axis A2 will keep its orientation in relation to the apparatus 10 at all times. For the example embodiment, the second axis A2 is substantially parallel with a lateral direction L2 of the movable material processing apparatus 10, and the second axis A2 is located on a side of the loading block 110 opposite to the side where material is loaded onto the foldable conveyor 100. This is best illustrated in FIG. 2a. The pivoting along the first A1 and second A2 axes is in the example embodiment realized using a linkage based upon a shaft protruding through openings in the support structure and the loading frame, respectively. However, the foldable conveyor 100 should not be limited to any specific means of achieving the pivoting as defined in the appended claims.

As pivoting along the first A1 and second A2 axis may be performed independent on each other, it is understood that the folding and unfolding process does not have one determined route, i.e. it is possible to perform the unfolding and folding of the foldable conveyor 100 in different ways. To exemplify this, two such folding routes are described herein. Starting in the operating position O (FIG. 2b and FIG. 1), one way to fold the conveyor 100 is to first pivot the discharge frame 120 in relation to the loading frame 110 along the first axis A1 to an upward position U, said upward position U being shown in FIG. 2d and FIG. 3. In the upward position U, the foldable conveyor 100 resembles the transport position often seen in movable material processing apparatuses of the art. For some embodiments of the present apparatus 10, it is conceivable to transport the apparatus 10 when the foldable conveyor 100 is in the upward position U, i.e. the upward position U will be also a transport position T. However, for preferred embodiments, pivoting of the foldable conveyor 100 will first be done along the second axis A2. Thus, starting in the upward position U (FIG. 2d and FIG. 3), the loading frame 110 may be pivoted in relation to the supporting structure 130 along the first axis A1 such that the discharge frame 120 of the conveyor 100 obtains a composant directed towards the rear end 13 of the movable material processing apparatus 10. After this second pivoting operation along the second axis A2, the foldable conveyor 100 has reached its transport position T.

Figure 2C:
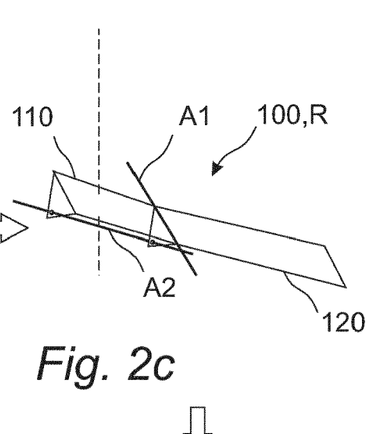
FIG. 2c is a simplified perspective view of the foldable conveyor when arranged in an upward position.
Figure 2E:
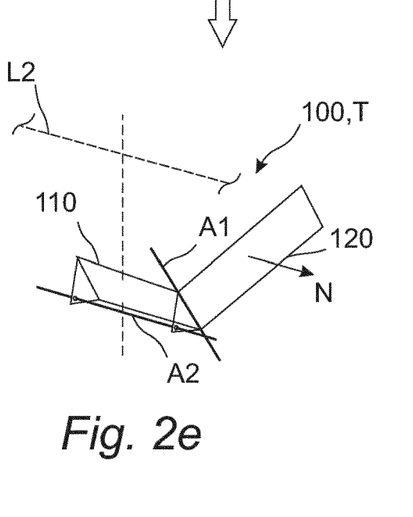
FIG. 2e is a simplified perspective view of the foldable conveyor when arranged in a transport position.
Figure 3:
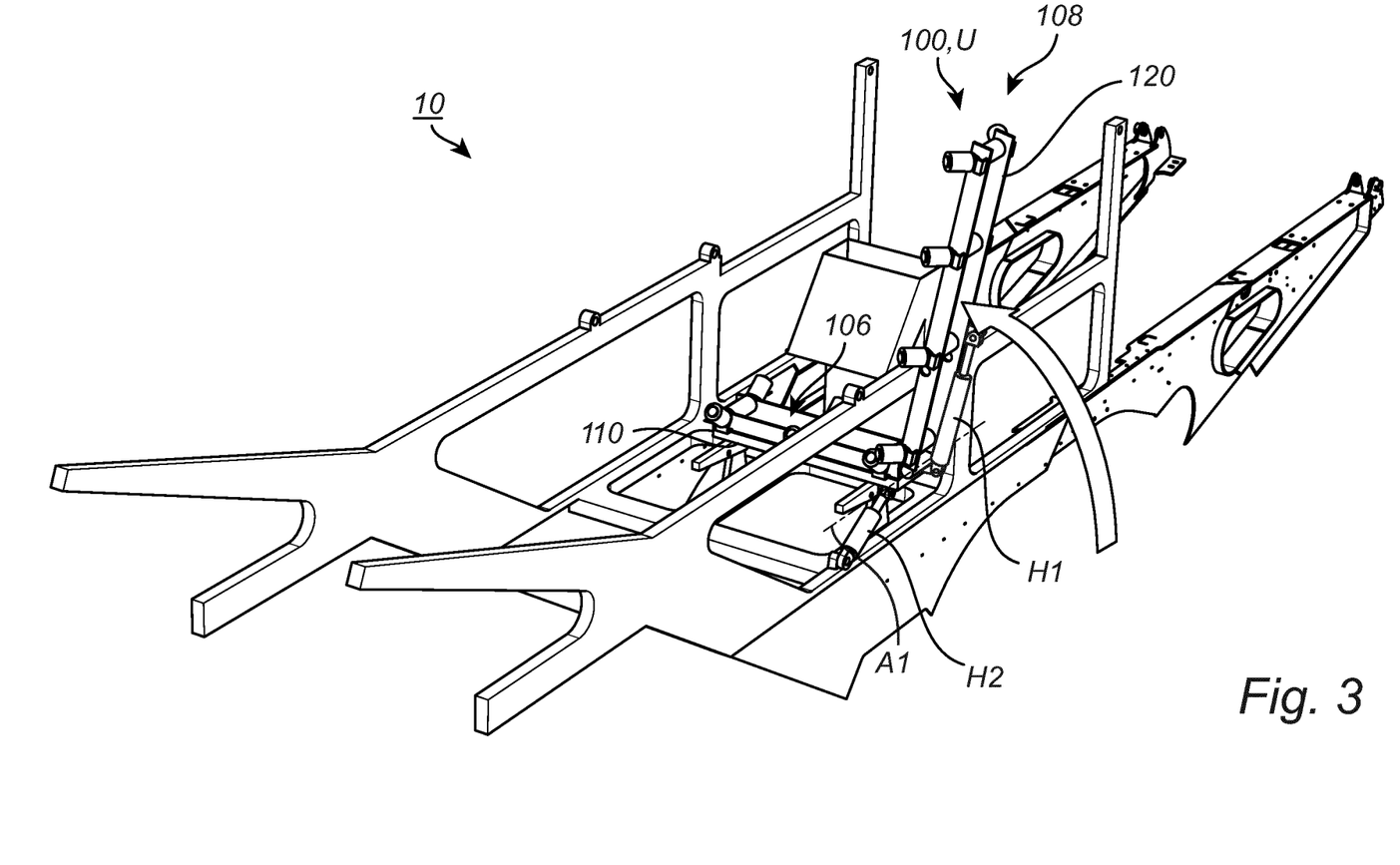
FIG. 3 shows a perspective view of the movable material processing apparatus of FIG. 1 wherein a discharge frame of the foldable conveyor is pivoted along a first axis to move the foldable conveyor from the operating position to the upward position. The conveyor belt and parts of the apparatus have been omitted for clarity.
Figure 5:
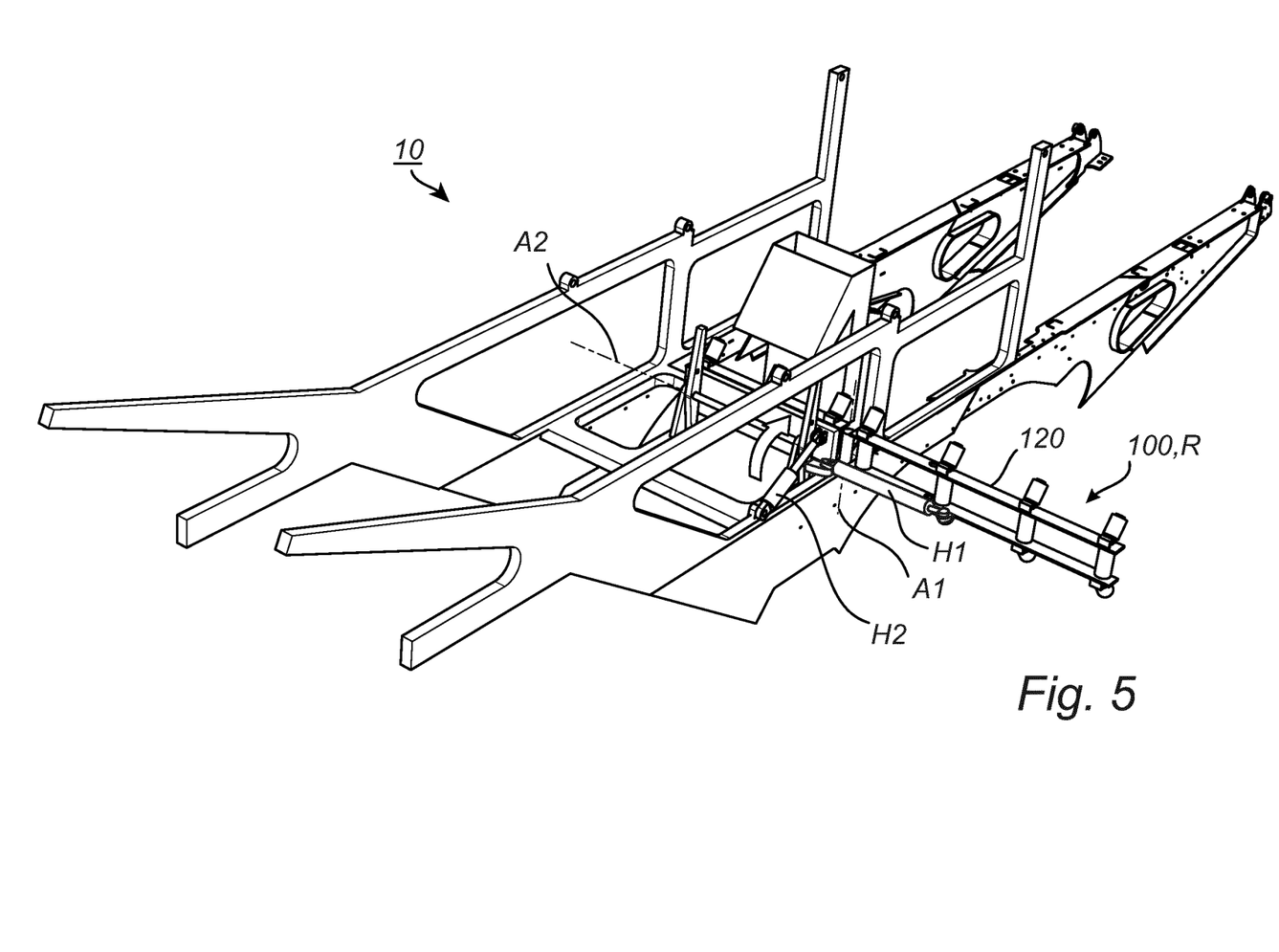
FIG. 5 shows a perspective view of the movable material processing apparatus of FIG. 1 wherein the loading frame of the foldable conveyor is pivoted along the second axis to move the foldable conveyor from the operating position to a rotated position. The conveyor belt and parts of the apparatus have been omitted for clarity.
Figure 6:
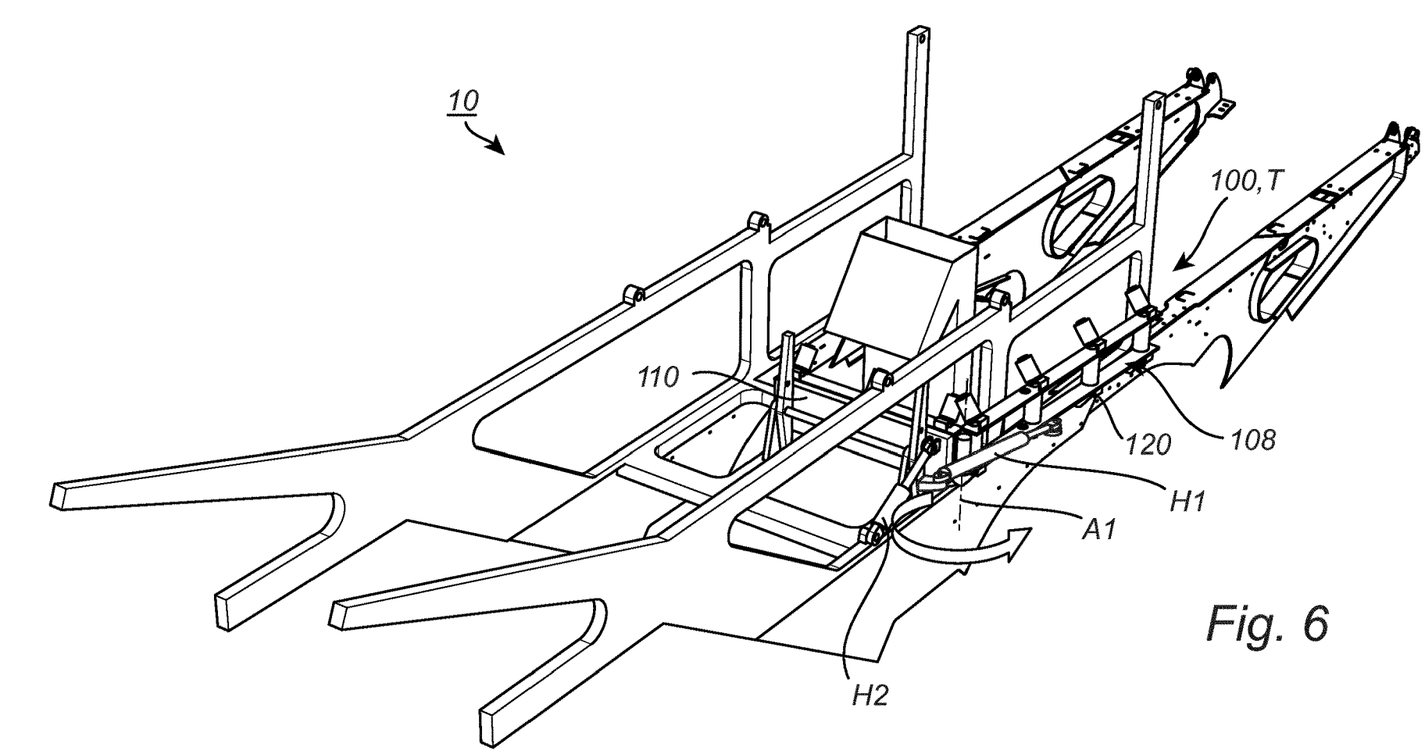
FIG. 6 shows a perspective view of the movable material processing apparatus of FIG. 5 wherein the discharge frame of the foldable conveyor is pivoted along the first axis to move the conveyor from the rotated position to the transport position. The conveyor belt and parts of the apparatus have been omitted for clarity.

An alternative folding route will now be described. Starting yet again in the operating position O (FIG. 2b and FIG. 1), another way to fold the conveyor 100 is to first pivot the loading block 110 in relation to the apparatus 10 along the second axis A2 so as to rotate the entire conveyor 100 in relation to the apparatus 10. After rotating the entire conveyor 100 along the second axis A2, the conveyor 100 will arrive in the rotated position R, as shown in FIG. 2c and FIG. 5. Starting from the rotated position R (FIG. 2c and FIG. 5), the discharge frame 120 may be pivoted in relation to the loading frame 110 along the first axis A1 such that the discharge frame 120 of the conveyor 100 obtains a composant directed towards the rear end 13 of the movable material processing apparatus 10, as described earlier. Thus, after this second pivoting operation along the first axis A1, the foldable conveyor 100 has reached the transport position T (FIG. 2e and FIG. 6). This alternative route just described has certain advantages for some embodiments of the apparatus 10. Often, equipment such as processing means such as a screen and/or transporting means such as a conveyor or feeder of the movable material processing apparatus 10 will be positioned such that it occupies space above the foldable conveyor 100 and extending laterally outwardly along sides of the apparatus 10. For such embodiments, the foldable conveyor 100 cannot be arranged in the upward position U, simply because the discharge frame 120 would hit parts of the apparatus sticking out above the conveyor. By instead using the alternative folding route via the rotated position R, the conveyor 100 may be folded to the transport position T without risking to encounter this problem. As realized by the skilled person, may alternative ways exist for folding and unfolding the foldable conveyor 100 between the operating O and transport T positions. For example, the pivoting along the first A1 and second A2 axis may be done alternatingly by the operator for example in cases where space is limited due to proximity of a target such as a wall or another piece of equipment.

Figure 4:
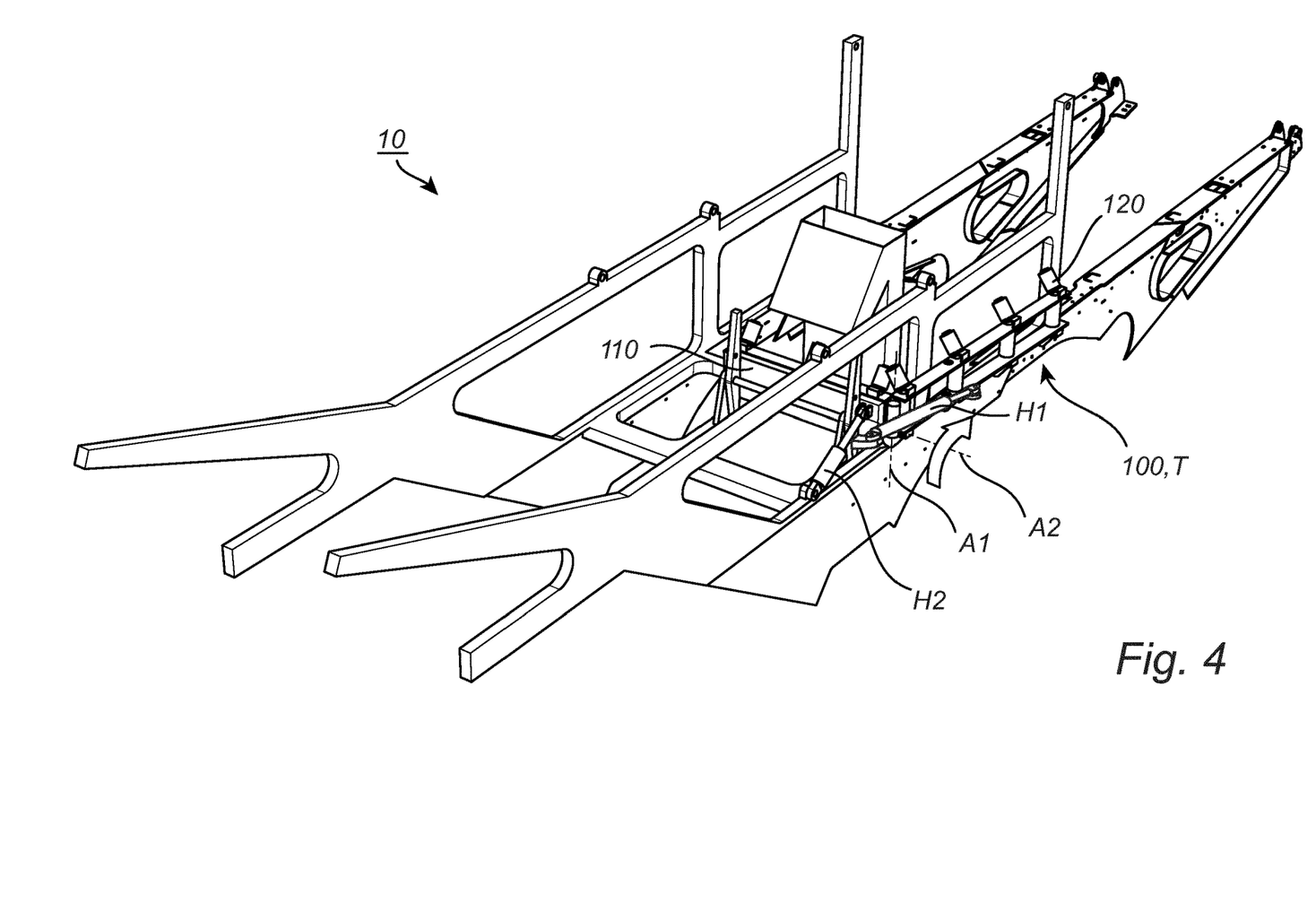
FIG. 4 shows a perspective view of the movable material processing apparatus of FIG. 3 wherein a loading frame of the foldable conveyor is pivoted along a second axis to move the foldable conveyor from the upward position to the transport position. The conveyor belt and parts of the apparatus have been omitted for clarity.

The transport position T is illustrated in FIG. 2e and FIG. 6. In the transport position T, the discharge block 120 is disposed along the side 11 of the apparatus 10. As can be seen in FIG. 2e and FIG. 4, the discharge frame 120 is not perfectly aligned with the longitudinal direction L1 of the apparatus 10. Rather it forms an oblique angle and has an upwardly directed composant. For some embodiments, the discharge block 120 is generally directed towards a rear end 13 of the apparatus 10, and forms an angle $\alpha$ in the interval $0<\alpha<60°$ with respect to a longitudinal direction L1 of the apparatus 10. The transport position T is further characterized by allowing the discharge frame 120 to be disposed against the side 13 of the apparatus 10. For preferred embodiments, the discharge block 120 of the foldable conveyor 100, when the foldable conveyor 100 is in the transport position T, is disposed against the side 11 of the apparatus 10 such that a normal N of the carrying surface 102 at the discharge end 108 is substantially parallel with the lateral direction L2 of the apparatus 10. This is illustrated in FIG. 2e.

As can be seen in FIGS. 3-6, the discharge block 120 is pivotable in relation to said loading block 110 along the first axis A1 using one or more first hydraulic actuators H1, and the loading block 110 is pivotable in relation to the support structure 130 of the movable material processing apparatus 10 along the second axis A2 using one or more second hydraulic actuators H2. For the example embodiment, the first H1 and second H2 hydraulic actuators are operatively coupled to a common hydraulic system (not shown) capable of selectively operating the first hydraulic actuators H1 and the second hydraulic actuators H2, respectively.

The foldable conveyor 100 comprises a conveyor belt 140 carried by the loading 110 and discharge 120 blocks. The conveyor belt 140 is arranged to provide said carrying surface 102.

Figure 7:
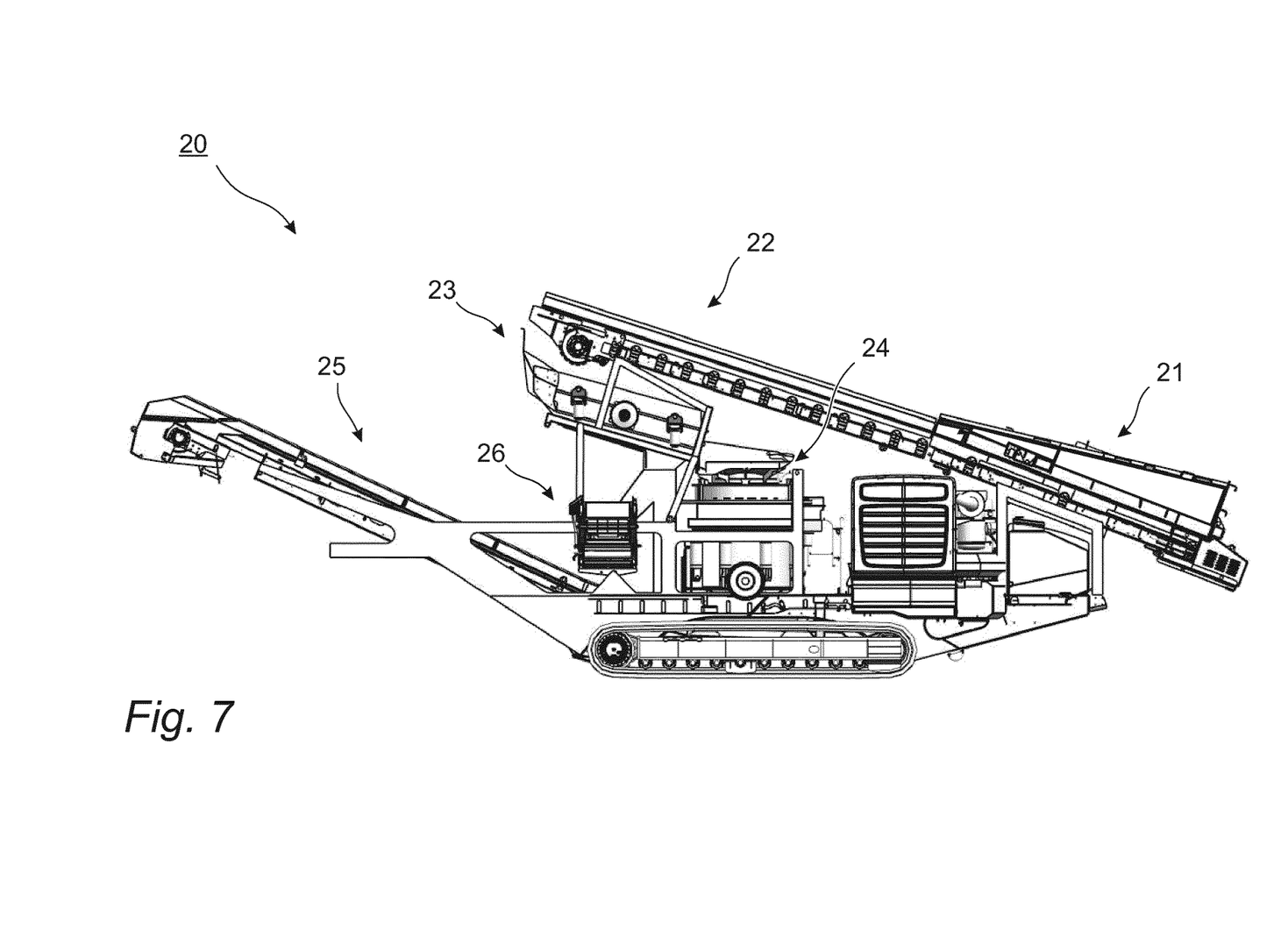
FIG. 7 shows a side view of a movable material processing apparatus comprising a screen, a crusher, and conveyors, one of which being a foldable conveyor according to embodiments of the present disclosure.

FIG. 7 shows a side view of a movable material processing apparatus 20 comprising a screen 23, a crusher 24, and a plurality of conveyors 22,25,26. Material is fed into an receiving end 21 of a feeder 22 (comprising a conveyor) e.g. by an excavator, a wheel loader or a dump truck. The material is transported by the feeder 22 to the screen 23 which separates the material according to its fractions. The large fraction is fed to the crusher 24, whereby the material output from the crusher 24 is transported and outputted from the apparatus 20 by means of a discharger 25 (comprising a conveyor). The small fraction is transported and output from the apparatus using a foldable side conveyor 26.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A movable material processing apparatus for handling material, comprising:
a foldable conveyor for discharging material from the apparatus, wherein said foldable conveyor is movable between a transport position and an operating position, wherein the foldable conveyor, when arranged in the operating position, defines a carrying surface for transporting material along a transport path from a loading end of the conveyor at which material is loaded onto said carrying surface, to a discharge end of the conveyor at which material is discharged from the conveyor,
said foldable conveyor comprising a loading block arranged at the loading end, and a discharge block extending from said loading block towards the discharge end,
wherein said discharge block is pivotally coupled to said loading block along a first axis being perpendicular to said transport path and parallel with the carrying surface of the foldable conveyor, and
wherein said loading block is pivotally coupled to a support structure of said movable material processing apparatus at the loading end along a second axis being parallel to said transport path at the loading end.

2. The movable material processing apparatus according to claim 1, wherein the discharge block extends out from a side of the apparatus when the foldable conveyor is in the operating position, and the discharge block is disposed along the side of the apparatus when the foldable conveyor is in the transport position.

3. The movable material processing apparatus according to claim 1, wherein the foldable conveyor comprises one or more conveyor belts carried by the loading and discharge blocks, said one or more conveyor belts being arranged to provide said carrying surface.

4. The movable material processing apparatus according claim 3, wherein the foldable conveyor comprises one common conveyor belt arranged to form a transition between the loading and discharge blocks to provide said carrying surface.

5. The movable material processing apparatus according to claim 1, wherein the second axis is substantially parallel with a lateral direction of the movable material processing apparatus.

6. The movable material processing apparatus according to claim 1, wherein the second axis forms an angle defined along the longitudinal direction being within the interval +/−10 degrees with respect to the lateral direction of the movable material processing apparatus.

7. The movable material processing apparatus according to claim 1, wherein the second axis is located on a side of the loading block opposite to the side where material is loaded onto the foldable conveyor.

8. The movable material processing apparatus according to claim 1, wherein the discharge block is pivotable in relation to said loading block along the first axis using one or more first hydraulic actuators.

9. The movable material processing apparatus according to claim 1, wherein the loading block is pivotable in relation to the support structure of the movable material processing apparatus along the second axis using one or more second hydraulic actuators.

10. The movable material processing apparatus according to claim 2, wherein the discharge block of the foldable conveyor, when the conveyor is in the transport position, is disposed against the side of the apparatus such that a normal of the carrying surface at the discharge end is substantially parallel with the lateral direction of the apparatus.

11. The movable material processing apparatus according to claim 10, wherein the discharge block is generally directed towards a rear end of the apparatus and forms an angle a in the interval $0 < \alpha < 60°$ with respect to a longitudinal direction of the apparatus.

12. The movable material processing apparatus according to claim 1, wherein the movable material processing apparatus comprises one or more from: a screen, a crusher and a conveyor.

* * * * *